(12) United States Patent  
Harting

(10) Patent No.: US 8,425,095 B2  
(45) Date of Patent: Apr. 23, 2013

(54) MIRROR ASSEMBLY

(75) Inventor: Thomas Harting, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 144 days.

(21) Appl. No.: 13/169,287

(22) Filed: Jun. 27, 2011

(65) Prior Publication Data

US 2012/0327672 A1  Dec. 27, 2012

(51) Int. Cl.
*B60Q 1/26*  (2006.01)

(52) U.S. Cl.
USPC .......................................... 362/494; 362/496

(58) Field of Classification Search .................. 362/240, 362/241, 249.01–249.03, 249.07, 249.1, 362/362/478, 485, 494, 498, 516, 523, 540, 362/543, 545, 548, 549
See application file for complete search history.

(56) References Cited

U.S. PATENT DOCUMENTS

| 6,049,271 | A | * | 4/2000 | Chu ............................... 340/463 |
| 6,764,207 | B2 |  | 7/2004 | Abalos et al. |
| 2002/0064052 | A1 |  | 5/2002 | Abalos et al. |

* cited by examiner

*Primary Examiner* — Hargobind S Sawhney  
(74) *Attorney, Agent, or Firm* — Jeffrey P. Calfa; Mark C. Bach

(57) ABSTRACT

A mirror assembly for illuminating an underhood area of a vehicle having an electrical system includes a mirror head outer shell defining a light reception opening. At least one work light is mounted to the mirror head outer shell within the light reception opening. The work light is constructed and positioned such that the light emitted from the work light is directed at the underhood area of the vehicle to illuminate the underhood area.

18 Claims, 2 Drawing Sheets

MIRROR ASSEMBLY

BACKGROUND

Embodiments described herein relate generally to lighting on a vehicle, and more particularly, to lighting of the underhood area of a vehicle.

Commercial truck drivers conduct a daily pre-trip inspection of the vehicle. The underhood area and engine compartment are inspected to check fluid levels, fluid leakage, belt conditions, frayed or broken wires, as well as other component conditions. The underhood area of a commercial vehicle is typically not illuminated. When the inspection is conducted at night or in dark conditions, the truck driver uses a flashlight or other handheld light. However, using a flashlight to light the underhood area can be awkward, particularly during the inspection checks that are two-handed operations, for example checking the fluid levels. When the truck driver uses a flashlight, the underhood inspection becomes a more difficult and less efficient process.

SUMMARY

A mirror head assembly for illuminating an underhood area of a vehicle having an electrical system includes a mirror head outer shell defining a light reception opening. At least one work light is mounted to the mirror head outer shell within the light reception opening. The work light is constructed and positioned such that the light emitted from the work light is directed at the underhood area of the vehicle to illuminate the underhood area.

A mirror mounting assembly for illuminating an underhood area of a vehicle having an electrical system includes at least one mirror mounting component and a mirror head assembly. The mirror mounting component is configured for attachment to the vehicle, and the mirror head assembly is mounted to the vehicle with the at least one mirror mounting component. The mirror head assembly includes a mirror head outer shell, and at least one work light is mounted to the mirror head outer shell. The work light emits light that is non-amber in color. The work light is constructed and positioned such that the light emitted from the at least one light is directed at the underhood area of the vehicle to illuminate the underhood area.

A method of illuminating an underhood area of a vehicle having an electrical system includes the step of mounting at least one work light to a mirror head assembly. The work light is positioned such that a majority of the light emitted from the at least one work light is directed at the underhood area to illuminate the underhood area. The method also includes the step of electrically connecting an electrical connection portion of the at least one light to the electrical system of the vehicle.

DETAILED DESCRIPTION

Figure 1:
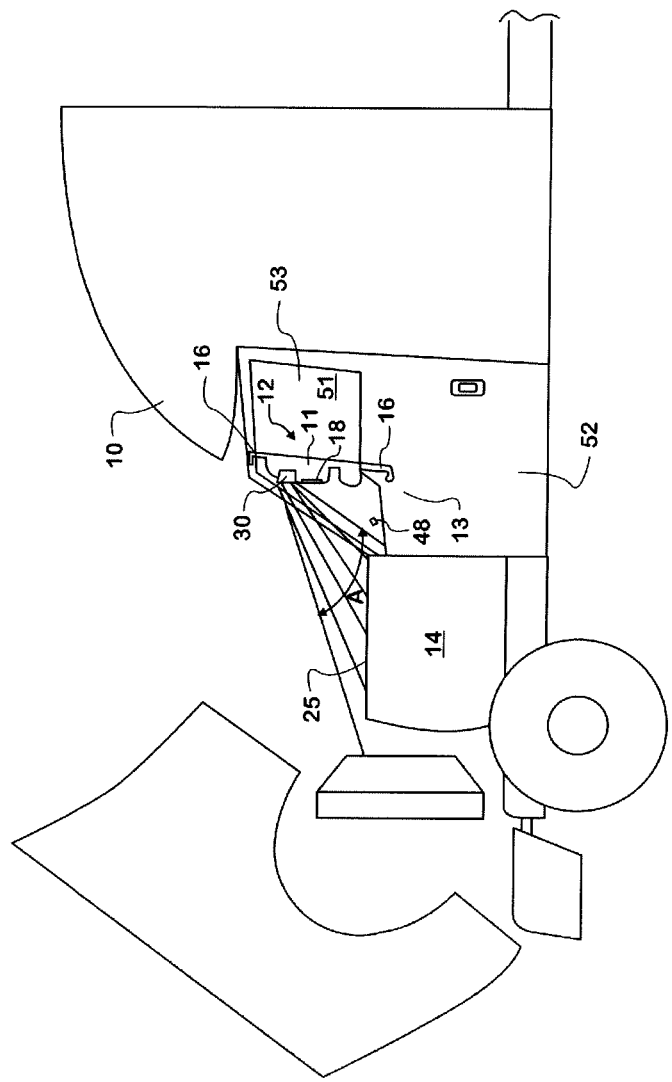
FIG. 1 is a side elevation of a vehicle having an underhood engine compartment and having a mirror assembly.
Figure 2:
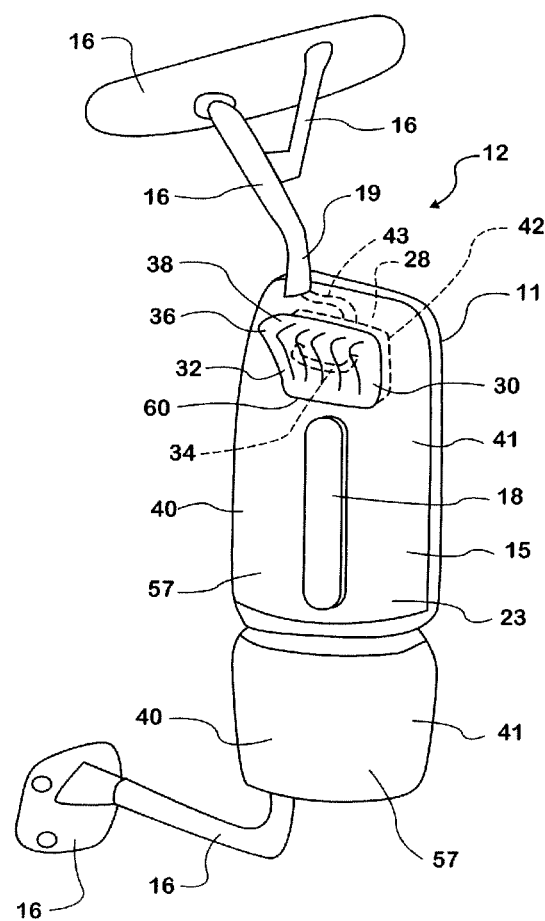
FIG. 2 is a perspective view of the mirror assembly.

Referring to FIGS. 1-2, a mirror mounting assembly is indicated generally at 12. Mirror mounting assemblies are known in the art, and one type of such a mirror mounting assembly is described in a commonly assigned patent to Abalos et al., U.S. Pat. No. 6,764,207, which is incorporated by reference herein. While the following description will be made with reference to a mirror mounting assembly 12 for a commercial vehicle 10, it should be appreciated that the mirror mounting assembly can be incorporated on other types of vehicles. The mirror mounting assembly 12 is configured for use on a vehicle 10 having an engine compartment 14 located in an underhood area 25.

The mirror mounting assembly 12 includes a mirror head assembly 11 and mirror head mounting components 16. The mirror head assembly 11 is mounted to the mirror head mounting components 16 of the mirror mounting assembly 12, and the mirror head mounting components 16, are, in turn, mounted to the vehicle 10 such that the mirror head assembly 11 is positioned adjacent to or at a distance from exterior surfaces 13 of the vehicle 10. The mirror head assembly 11 includes one or more mirrors (not shown) and a mirror head outer shell 15. As is commonly known, the purpose of the mirrors of the mirror head assembly 11 is to allow individuals to view, in the mirrors, areas surrounding the vehicle 10 that they could not easily view via a direct line of sight. The mirror head outer shell 15 comprises a shell wall 57 that is substantially continuous and is disposed primarily on a side of the mirrors of the mirror head assembly 11 opposite their reflecting surfaces. The mirror head outer shell 15 and the mirror head mounting components 16 of the mirror mounting assembly 12 may be constructed and engaged to one another in any of a number of ways that are well known. In FIG. 2, the mirror head mounting components 16 include a C-shaped mirror head mounting member 19 that is pivotally mounted to the vehicle 10.

The mirror head assembly 11 may include one or more marking lights 18, which delineate the length of extension of the mirror head assembly 11 from the exterior surface 13 of the vehicle, and the width of the vehicle 10. The marking lights 18 may be mounted to the mirror head assembly 11 adjacent the shell wall 57 of the mirror head outer shell 15 in any of a number of ways, such as mounted directly to the mirror head outer shell 15. Alternatively, the marking lights 18 may be mounted to other components of the mirror head assembly 11 directly or indirectly. U.S. Government regulations dictate that marking lights 18 are to be amber in color and that the marking lights 18 have a forward, generally horizontal orientation/direction of light emission. As such, the marking lights 18 do not provide sufficient light energy and are not aimed downward in the direction of the underhood area 25 for the purposes of illuminating the underhood area. Instead, the marking lights 18 merely aid in judging clearance between the mirror head assembly 11 and objects in the environment.

For the purposes of illuminating the underhood area 25 of a vehicle, at least one work light 30 is mounted in the mirror head assembly 11. The one or more work lights 30 may be incandescent or LED, with LED having the added benefit of a much longer service life. As such, the work lights 30 may include a lens/bulb 32 and a die/filament 34. The work light 30 may be white light, and may be directed downward at the underhood area 25. The work light 30 is preferably white light, however any other color is possible. Further, the work light 30 may also be a non-amber color. The at least one work light 30 may be constructed and positioned such that a majority of the light emitted is directed at the underhood engine compartment 14 to illuminate the underhood area 25, particularly during inspections. It is possible that the area illuminated A is larger than the underhood area 25, generally the same as the underhood area, or smaller than the underhood area. Further, it is possible that the lens/bulb 32 can be adjusted to focus the light emitted. It is also possible that the work light 30 is mounted to the mirror head assembly 11 to be movable, i.e. to displace or rotate, such that the area illuminated A can be displaced or rotated.

The mirror head assembly 11 may be constructed such that the at least one work light 30 is disposed partially inwardly or recessed of the outer surfaces 23 of the mirror head outer shell 15. In this configuration, the shell wall 57 of the mirror head outer shell 15 may define one or more light reception opening(s) 60. The opening 60 may have any shape generally corresponding to the shape of the light 30 such that there is little to no gap between the light and the opening One or more work lights 30 may be disposed within the light reception opening 60 defined by the shell wall 57 of the mirror head outer shell 15. The lens/bulb 32 of the work lights 30 that are disposed in the one or more light reception openings 60 may protrude outwardly of the outer surfaces 23 of the mirror head outer shell 15. The at least one work light 30 may be disposed generally contiguous and flush with outer surfaces 23 of the mirror head outer shell 15. To direct the light energy emitted from the work light 30 down at the underhood area 25 and the engine compartment 14, the work light 30, the lens/bulb 32, or an associated lamp cover 32 may be contoured, such as being contoured partially outboard of the outer surfaces 23. In the work light 30 of FIG. 2, the work light has an outermost extent 36 generally at an upper portion 38 of the work light.

The mirror head outer shell 15 defines the light receptacle opening 60, which is a recess defined between recess walls that are a portion of the shell wall 57 and extend inwardly of outer surfaces 23 of the mirror head outer shell. The engagement of the work light 30 to the light receptacle opening 60 may be any of a number of designs, such as a snap-fit design.

Each of the lights 30 mounted to the mirror head assembly 11 has an electrical connection portion 42 that is electrically connected to a wiring harness 43. The wiring harness 43, in turn, is electrically connected to the electrical system of the vehicle 10 so that electrical power can be provided to the work light 30 by the electrical system of the vehicle. The wiring harness 43 can be used to electrically power the work light 30 in addition to any marking lights 18. In a mirror head assembly 10 with pre-existing marking lights 18, the wiring harness 43 is already in place, so there is no need for an additional wiring harness, only for an additional power feed wire within the existing harness. The points of connection between the electrical connection portions 42 of the work light 30 and the wiring harness 43 may be concealed within either the interior 28 of the mirror head assembly 11. The wiring harness 43 eventually extends out of the interior 28 of the mirror head assembly 11 through one or more openings defined by the mirror head outer shell 15.

In the mirror mounting assembly 12 of FIG. 2, the mirror head outer shell 15 defines a narrow waistline portion 33 that is positioned between the first mirror (not shown) and the second mirror (not shown). The work light 30 may be disposed either on the shell wall 57 above the waistline portion 33 or below the waistline portion.

The mirror head assembly 11 is an "aero style" mirror head assembly 11. Such an "aero style" mirror head assembly 11 is constructed with such a shape and is mounted to the vehicle 13 in such a position and orientation that as the vehicle 10 travels at speed on roadways, the mirror head assembly 11 presents relatively little aerodynamic drag. The mirror head outer shell 15 is constructed in such a manner that the outer surfaces 23 of the mirror head outer shell 15 define rear shell portions 41 that are disposed relatively close to and substantially perpendicular to reflecting surface peripheries of the mirrors 17. The outer surfaces 23 of the mirror head outer shell 15 extend from the rear shell portions 41, away from the mirrors on a side of the mirrors opposite the reflecting surfaces, and meet at forward shell portions 40. The forward shell portions 40 are a portion of the outer surfaces 23 of the mirror head outer shell 15 distant from the rear shell portions 41. The outer surfaces 23 of the mirror head outer shell 15 curve gently as they extend from the rear shell portions 38 to the forward shell portions 40. It is possible that the work light 30 may also curve generally with the curvature of the rear shell portion 38 and the forward shell portion 40.

The mirror head assembly 11 of the present invention may be constructed in one of many different ways and mounted to the vehicle 10 at one of many different locations to accommodate viewing of many different areas surrounding the vehicle. Accordingly, the mirror head assembly 11 may be mounted to the vehicle 13 adjacent to or at a distance from exterior surfaces 14 of a door 52 of an occupant cabin 51 of the vehicle 10. The mirror head assembly 11 may also be mounted at a height similar to that of a window 53 of the door 52. At such a height and alignment, the work light 30 may emit light over an illuminated area A that at covers at least a portion of the underhood area 25.

The work lights 30 can be activated by the operator to provide illumination for conducting pre-trip inspections. It is possible that the operator can activate the work lights 30 with an actuator switch 48 located inside or outside of the vehicle cabin 51. It is also possible to integrate the work light control with other vehicle inputs, such as vehicle speed, gear position, and/or park brake setting, such that the work light 30 is disabled when the vehicle is in motion. Illumination of the work light 30 may only be permitted when the vehicle 12 is not in motion.

By mounting work lights 30 on the mirror head assembly 11, the underhood area 15 of the vehicle 10 can be illuminated with little to no impact on the aerodynamic drag of the vehicle. Further, mounting work lights 30 on the mirror head assembly 11 does not obstruct the view of the driver. Additionally, the mirror head assembly 11 has relatively low vibration compared to other components, such as vehicle hoods, so little vibration is transferred to the work lights 30. Further still, the mirror mounting assembly 10 typically has a wire harness for the marking lights 18, so no additional wire harness is needed for the work light 30.

What is claimed is:

1. A mirror head assembly for illuminating an underhood area of a vehicle having an electrical system, the mirror head assembly comprising:
   a mirror head outer shell defining a light reception opening;
   at least one work light mounted to the mirror head outer shell within the light reception opening; and
   wherein the at least one work light is constructed and positioned such that the light emitted from the at least one work light is directed at the underhood area of the vehicle to illuminate the underhood area.

2. The mirror head assembly of claim 1 further comprising at least one marking light mounted to the mirror head outer shell.

3. The mirror head assembly of claim 2 wherein the at least one marking light emits amber light and the at least one work light emits white light.

4. The mirror head assembly of claim 1 wherein the mirror head outer shell is constructed such that the at least one work light is disposed at least partially recessed from an outer surface of the mirror head outer shell.

5. The mirror head assembly of claim 4 wherein the at least one work light is generally contiguous and flush with the outer surface.

6. The mirror head assembly of claim 1 wherein the at least one work light includes at least one of a lens and a lamp cover.

7. The mirror head assembly of claim 6 wherein the at least one of a lens and a lamp cover is contoured having an outermost extent that protrudes from an outer surface of the mirror head outer shell.

8. The mirror head assembly of claim 7 wherein the outermost extent is located at an upper portion of the work light.

9. The mirror head assembly of claim 1 wherein the at least one work light has an electrical connection portion that is electrically connected to a wire harness that is connected to the electrical system of the vehicle.

10. A mirror head assembly for illuminating an underhood area of a vehicle having an electrical system, the mirror mounting assembly comprising:
- at least one mirror mounting component configured for attachment to the vehicle;
- a mirror head assembly mounted to the vehicle with the at least one mirror mounting component, said mirror head assembly comprising:
  - a mirror head outer shell; and
  - at least one work light mounted to the mirror head outer shell, wherein the work light emits light that is non-amber in color;
- wherein the at least one work light is constructed and positioned such that the light emitted from the at least one light is directed at the underhood area of the vehicle to illuminate the underhood area.

11. The mirror head assembly of claim 10 further comprising at least one marking light mounted to the mirror head outer shell.

12. The mirror head assembly of claim 11 wherein the at least one marking light emits amber light and the at least one work light emits white light.

13. The mirror head assembly of claim 10 wherein the mirror head outer shell is constructed such that the at least one work light is disposed at least partially recessed from an outer surface of the mirror head outer shell.

14. The mirror head assembly of claim 13 wherein the at least one work light is generally contiguous and flush with the outer surface.

15. The mirror head assembly of claim 10 wherein the at least one work light includes at least one of a lens and a lamp cover.

16. The mirror head assembly of claim 15 wherein the at least one of a lens and a lamp cover is contoured having an outermost extent that protrudes from an outer surface of the mirror head outer shell.

17. The mirror head assembly of claim 16 wherein the outermost extent is located at an upper portion of the work light.

18. The mirror head assembly of claim 10 wherein the at least one work light has an electrical connection portion that is electrically connected to a wire harness that is connected to the electrical system of the vehicle.

* * * * *